INVENTOR
James W. Phillips
BY Herbert M. Birch
ATTORNEY

PNEUMATIC FUNCTION GENERATOR

Filed Aug. 17, 1962 9 Sheets-Sheet 2

INVENTOR
James W. Phillips
BY Herbert M. Birch
ATTORNEY

May 25, 1965 J. W. PHILLIPS 3,185,168

PNEUMATIC FUNCTION GENERATOR

Filed Aug. 17, 1962 9 Sheets-Sheet 3

INVENTOR

James W. Phillips

BY Herbert M. Birch

ATTORNEY

INVENTOR
James W. Phillips
BY Herbert M. Birch
ATTORNEY

PNEUMATIC FUNCTION GENERATOR

Filed Aug. 17, 1962 9 Sheets-Sheet 5

INVENTOR
James W Phillips
BY Herbert M. Birch
ATTORNEY

May 25, 1965 J. W. PHILLIPS 3,185,168

PNEUMATIC FUNCTION GENERATOR

Filed Aug. 17, 1962 9 Sheets-Sheet 6

INVENTOR
James W. Phillips

BY Herbert M. Birch

ATTORNEY

PNEUMATIC FUNCTION GENERATOR

Filed Aug. 17, 1962 9 Sheets-Sheet 7

INVENTOR
James W. Phillips
BY Herbert M. Birch
ATTORNEY

May 25, 1965 J. W. PHILLIPS 3,185,168

PNEUMATIC FUNCTION GENERATOR

Filed Aug. 17, 1962 9 Sheets-Sheet 8

INVENTOR

James W. Phillips

BY Herbert M. Birch

ATTORNEY

PNEUMATIC FUNCTION GENERATOR

Filed Aug. 17, 1962

INVENTOR

James W. Phillips

BY Herbert M. Birch

ATTORNEY 3,185,168
PNEUMATIC FUNCTION GENERATOR
James W. Phillips, South Bend, Ind., assignor to Robertshaw Controls Company, a corporation of Delaware
Filed Aug. 17, 1962, Ser. No. 217,728
34 Claims. (Cl. 137—85)

This invention relates to function generators and more particularly to pneumatic function generators which produce an output signal which is a predetermined mathematical function of a plurality of input variables.

It is an object of this invention to provide a pneumatic function generator in the form of a force bridge comprising a pair of balance levers and a servo-controlled adjustable fulcrum for each of the said levers, the said levers being diaphragm mounted adjacent their tips whereby a plurality of variable forces in the form of signal pressures may be applied thereto.

Another object of this invention is to provide a pneumatic function generator in the form of a force bridge comprising a pair of balance levers and a servo-controlled adjustable fulcrum for each of the said levers, the said levers being diaphragm mounted adjacent their tips whereby a plurality of variable forces in the form of signal pressures may be applied thereto and whereby, the use of preselected curvatures of the said balance levers readily adapts the said function generator to produce both linear and non-linear output functions.

Still another object of this invention is to provide a pneumatic function generator in the form of a force bridge comprising a pair of balance levers and a servo-controlled adjustable fulcrum for each of the said levers, the said levers being diaphragm mounted adjacent their tips whereby a plurality of variable forces in the form of signal pressures may be applied thereto, all of the said levers being mounted on a single flat resilient diaphragm.

Still another object of this invention is to provide a pneumatic function generator of the force bridge type wherein hysteresis is eliminated.

Yet another object of this invention is to provide a pneumatic function generator of the force bridge type wherein the size, weight and expense thereof are reduced to a minimum.

Yet another object of this invention is to provide a pneumatic function generator of the force bridge type wherein the orientation of the generator in space is not critical to the operation thereof.

These and other objects of this invention will become more apparent with reference to the following specification and drawings which relate to a preferred embodiment of the invention.

Figure 1:
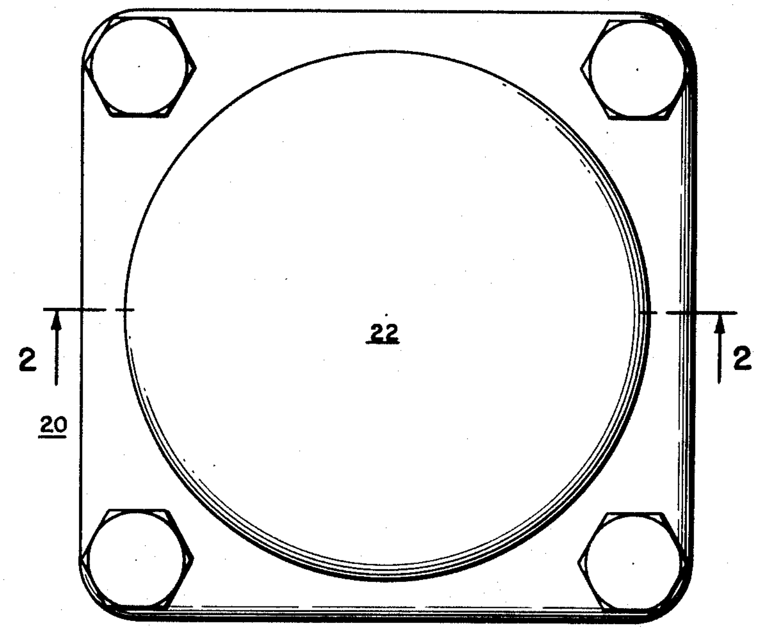
FIGURE 1 is a top end view of the invention.
Figure 2:
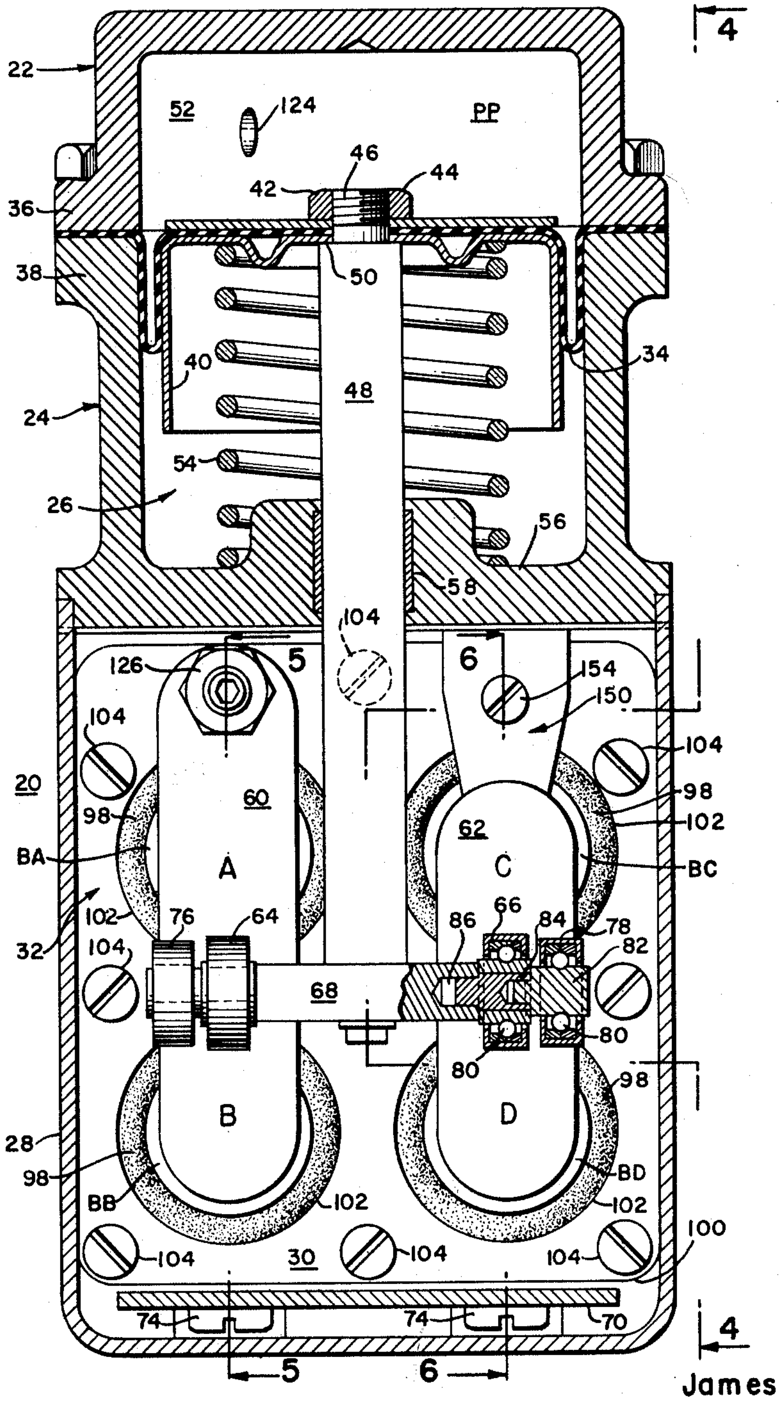
FIGURE 2 is a front elevation of the invention in cross-section taken along line 2—2 of FIGURE 1.

Referring in detail to the drawings and more particularly to FIGURES 1 and 2, one embodiment of the function generator of the invention is shown as comprising a housing 20 having a domed top end cap 22 and an upper hollow section 24 forming the external confines of a servo-motor 26 and a lower removable four-sided cover portion 28 removably mounted on a pressure plate assembly 30 which comprises an operative support means for a force bridge assembly 32.

The servo-motor 26 is of the expansible chamber type and includes a flexible motor diaphragm 34 clamped at its periphery between a flange 36 on the top end cap 22 and a flange 38 on the upper section 24 of the housing 20. The center of the motor diaphragm 34 is clamped to the upper surface of a piston 40 via a clamping plate 42 and a nut 44 threaded onto the upper tip 46 of the piston rod 48 which extends up through the piston 40 and the clamping plate 42 to an extent determined by an integral shoulder 50 thereon which abuts the lower surface of the piston 40.

The operating or expansible pressure chamber 52 of the servo-motor 26 is defined by the motor diaphragm 34 and the domed end cap 22. The piston 40 is biased by means of a piston return spring 54 concentric with the piston rod 48 and extending from the lower end wall 56 of the upper housing section 24 into engagement with the lower surface of the said piston 40, whereby the servo-motor 26 is always constrained to achieve a minimum volume in its expansible operating chamber 52.

The piston rod 48 extends through a bushing 58 in the lower wall 56 of the upper housing section 24 in symmetrical relationship with the force balance assembly 32.

The force balance assembly 32 is shown in FIGURE 2 as including first and second balance levers 60 and 62, respectively, each mounted by two-point means, to be later described, above the surface and generally parallel to the plane of the pressure plate assembly 30. The balance levers 60 and 62 are mutually parallel with the piston rod 48 which extends between them.

First and second adjustable fulcrums are respectively provided for each of the first and second balance levers 60 and 62 in the form of first and second rollers 64 and 66, respectively, mounted on opposite ends of a cross-bar or bearing carriage 68 perpendicular to the end of the piston rod 48 and integral therewith. The longitudinal axis of the bearing carriage 68 is parallel to the plane of the pressure plate assembly 30.

Figure 3:
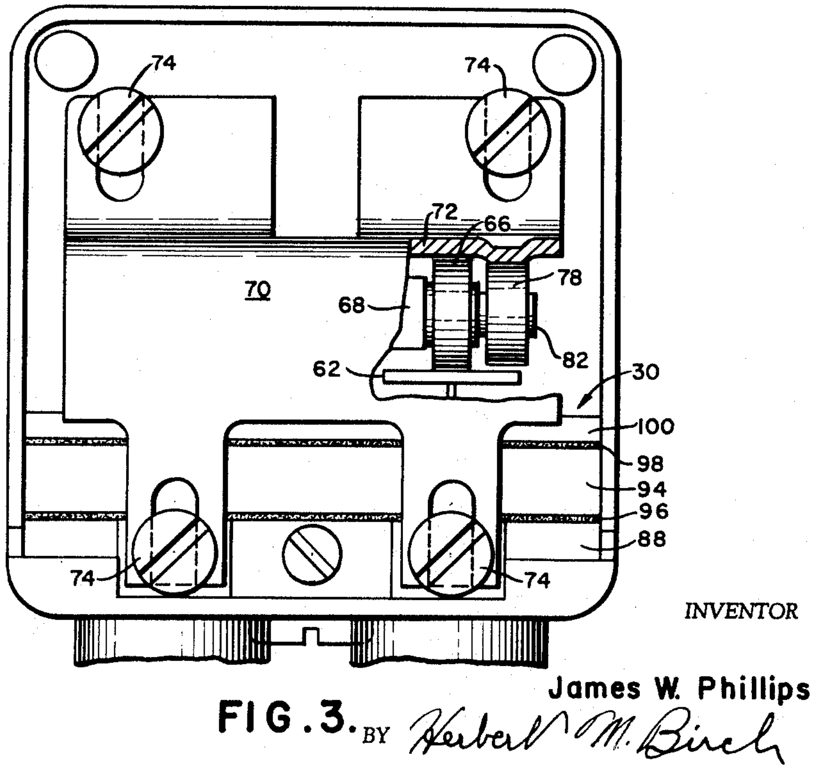
FIGURE 3 is a bottom end view of the invention with a portion of the housing thereof removed.
Figure 5:
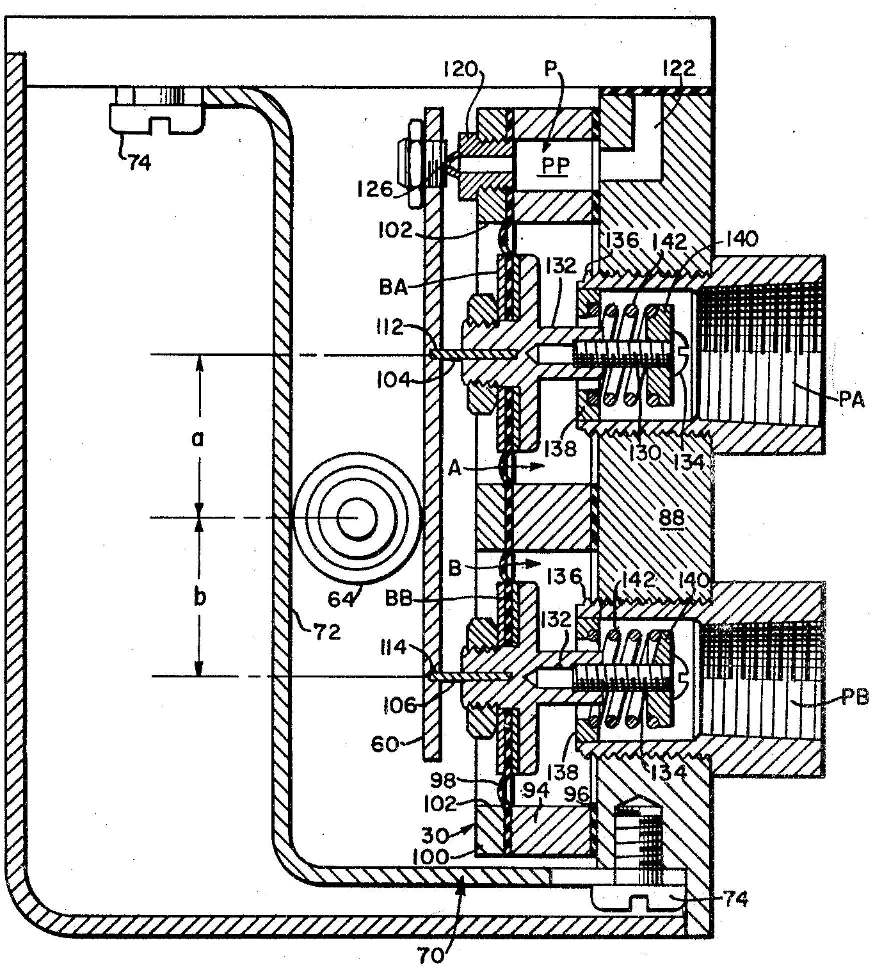
FIGURE 5 is a cross-sectional detail of the invention taken along line 5—5 of FIGURE 2.
Figure 6:
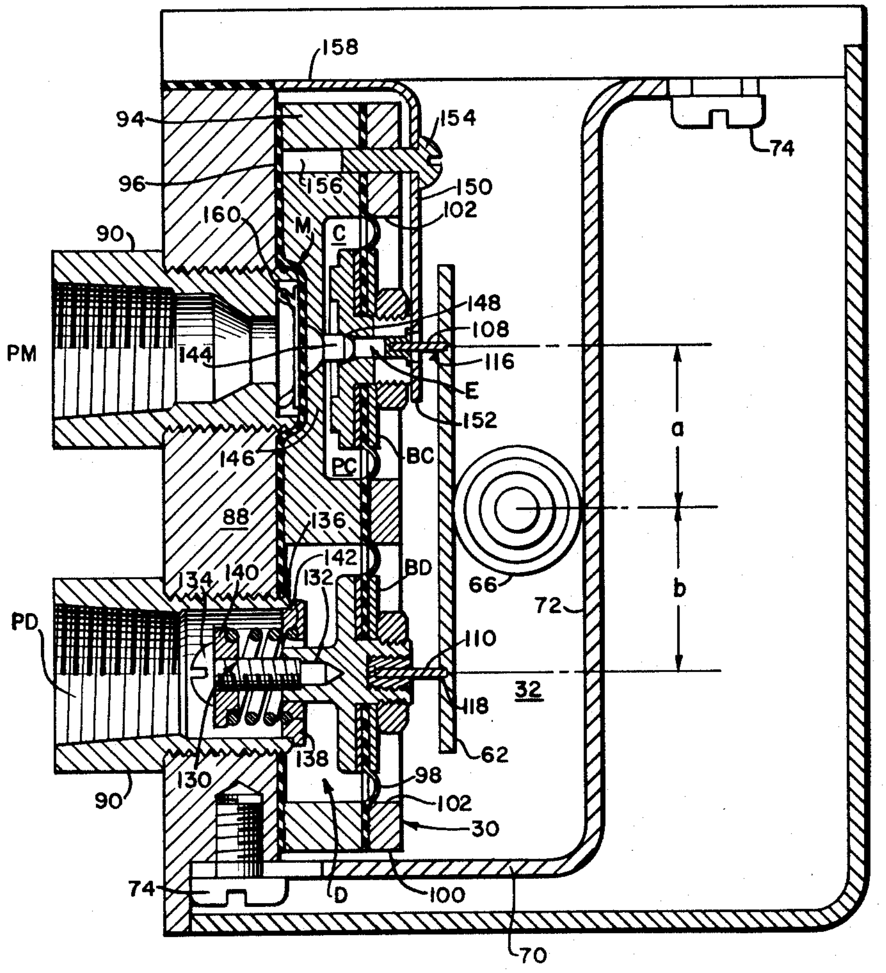
FIGURE 6 is a cross-sectional detail of the invention taken along line 6—6 of FIGURE 2.

As shown in more detail in FIGURES 3, 5 and 6, taken in conjunction with FIGURE 2, a second bearing surface in the form of a bearing plate 70 of sinuous cross-section is fixed over the balance levers 60 and 62 with a central portion 72 thereof coextensive with and having its inner surface parallel with the bearing surfaces of the said balance levers. A plurality of screws 74 are provided for affixing the bearing plate 70 to the pressure plate assembly 30.

A second set of rollers comprising first and second index rollers 76 and 78 are respectively positioned one adjacent each of the said first and second fulcrum rollers 64 and 66. As shown in FIGURES 2 and 3 in connection with the second fulcrum roller 66 and second index roller 78, these rollers are mounted on suitable bearings 80 with the rotational axis of the index roller 78 offset with respect to the rotational axis of the fulcrum roller 66. This is accomplished by means of an insertable extension 82 insertably mounted in an offset socket liner 84 in a centrally bored socked 86 in the end of the cross-bar or bearing carriage 68. The rotational axes of all of the fulcrum and index rollers 64–66 and 76–78, respectively, are offset such that the fulcrum rollers 64 and 66 engage, respectively, only the bearing surfaces of the first and second balance levers 60 and 62 while the first and second index rollers 76 and 78 engage only the inner surface of the central portion 72 of the bearing plate 70. Positive alignment of the piston rod 48 for all positions of the motor diaphragm 34 and piston 40 in the servo-motor 26 is thus provided.

The pressure plate assembly 30 is best described with reference to FIGURES 2, 4, 5 and 6 where the said assembly is shown as including a base plate 88 including a plurality of pressure inlet ports 90 carrying input pressures PA, PB, PB and PD of which PM comprises a source of main pressure which is to be controlled to produce a modulated output variable as a function of the input pressure variables PA, PB and PD. The output variable is taken via an outlet connection 92 in base plate 88 (FIGURE 4) and will be hereinafter designated PC.

Immediately adjacent the base plate 88 and mounted coextensively therewith is a pressure transfer plate 94. A sealing gasket 96 is provided between the base plate 88 and transfer plate 94.

The transfer plate 94 is provided with a plurality of pressure chambers A, B, C, D, M and P for receiving, respectively, input pressure PA, input pressure PB, modulated output pressure PC, input pressure PD, main pressure PM, and a position control pressure PP for the servo-motor 26.

Covering the pressure chambers A, B, C, D and P is a single resilient diaphragm 98 coextensive with the transfer plate 94. The pressure plate assembly 30 is substantially completed by means of a masking plate 100 coextensive with the diaphragm 98 with the exception of ports 102 therein in registry with those portions of the pressure chambers A, B, C and D which are covered by the diaphragm 98. A plurality of mounting screws 104 are provided to maintain the pressure plate assembly 30 in its assembled condition.

Mounted on the diaphragm 98 centrally of the ports 102 in the masking plate 100 and also centrally of the area covered by the said diaphragm in the pressure chambers A, B, C and D, respectively, of the pressure transfer plate 94, are a plurality of diaphragm buttons BA, BB, BC and BD.

As shown in FIGURES 5 and 6, exteriorly of the pressure chambers A, B, C and D in the transfer plate 94, each of the diaphragm buttons BA, BB, BC and BD carries an upstanding balance lever mounting pin 104, 106, 108 and 110, respectively. Each of the mounting pins 104, 106, 108 and 110 is substantially perpendicular to the plane of its respective diaphragm button and extends into a receiving socket 112, 114, 116, 118, respectively, in the underside of an adjacent end of one of the balance levers 60 and 62.

The first balance lever 60 is thus mounted via the mounting pins 104 and 106 on the diaphragm buttons BA and BB while the second balance lever 62 is mounted via the mounting pins 108 and 110 on the diaphragm buttons BC and BD.

Figure 4:
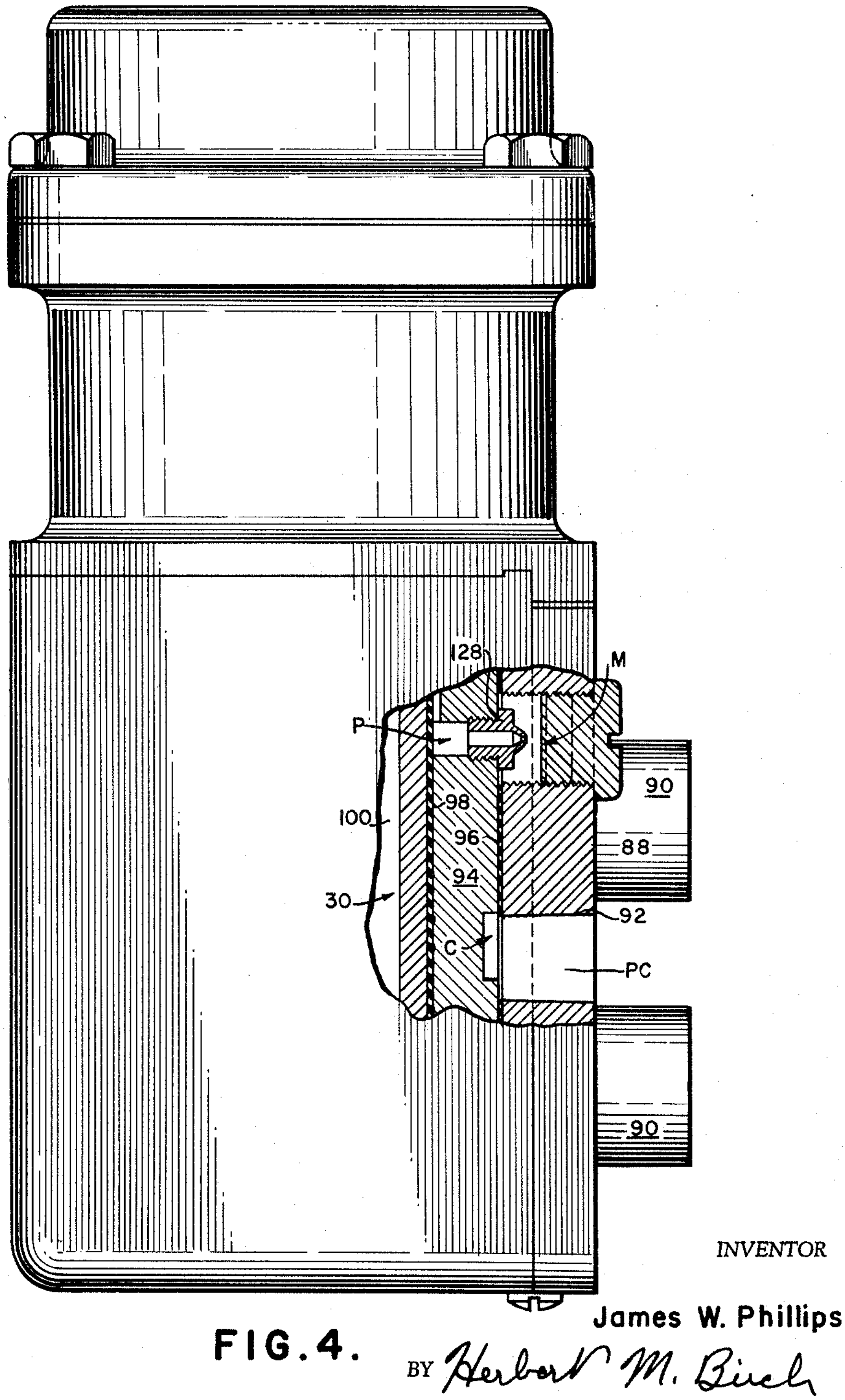
FIGURE 4 is a side elevation of the invention in partial cross-section taken along line 4—4 of FIGURE 2.

Referring now to FIGURES 2, 4 and 5, the first balance lever 60 extends beyond the mounting pin 104 on the diaphragm button BA over the chamber A to a position immediately above a leakport nozzle 120 in the masking plate 100 which extends therethrough into communication with the pressure chamber P in the transfer plate 94. The pressure chamber P communicates with the expansible chamber 52 of the servo-motor 26 via a transfer port 122 in the base plate 88 which extends upward through the upper housing section 24 and end cap 22 to the pressure port 124 in the inner wall of the said end cap, which is also within the expansible chamber 52.

The position control pressure PP is controlled by means of a valve head 126 on the end of the first balance lever 60 which cooperates with the leakport 120 to vary the back-pressure in the pressure chamber P. The source of supply pressure for the leakport is from the main pressure PM in the chamber M, which, as shown in FIGURE 4, is fed to the chamber P via a restrictor 128 mounted between the chamber M and the chamber P in the transfer plate 94.

As shown in FIGURES 5 and 6, there is provided a means for selectively and adjustably imparting a bias to the diaphragm 98 in those areas covering pressure chambers A, B and D via a plurality of identical variable spring devices 130 located in each of the said pressure chambers. While described in conjunction with the diaphragm button BD in chamber D, all of the corresponding numerals appear on all of the diaphragm buttons and biasing devices 130 in FIGURE 5. The diaphragm button BD is provided with an internally threaded stud 132 extending into the chamber D which receives the threaded shank portion of an adjusting screw 134. When inserted in the stud 132 the screw 134 extends from the chamber D into the associated pressure inlet coupling 90. A shoulder 136 on the inner end of the inlet coupling 90 provides a mounting point for a first spring seating flange 138 internally concentric with the said shoulder 136. By placing a second spring seating flange 140 on the screw 134 in juxtaposition with the screw head, means is thus provided whereby a helical compression spring 142 may be coextensively and concentrically disposed about the shank of the screw 134 between the first and second seating flanges 138.

While the pressure chambers A, B and D comprise input chambers since they are connected directly to the pressures supplied thereto, the chamber C, as shown in FIGURE 6, is an output chamber controlled by means of a double acting modulating relay valve 144 which is seated at one end thereof in a web portion 146 of the transfer port 94 between the chamber M and the chamber C and which is seated at its other end on a movable valve seat 148 comprising the inlet end of an exhaust port E extending through the diaphragm button BC to atmosphere at a point beneath the second balance lever 62.

Means for selectively and variably imparting a bias to the relay valve 144 is provided in the form of a leaf spring 150 having one end 152 thereof in engagement with the diaphragm button BC and including a through-port for the mounting pin 108. An adjusting screw 154 is provided intermediate the ends of the leaf spring 150 and is mounted in an internally threaded bore 156 in the masking and transfer plates 100 and 94. The other end 158 of the leaf spring 150 is disposed at right angles to the first end 152 on the opposite side of the screw 154 and is mounted in a fixed position adjacent one edge of the pressure plate assembly 30.

A counter bias on the relay valve 144 is provided by a spider spring 160 in the main pressure chamber M which normally maintains the valve 144 closed against the web 146.

The bearing surfaces of the first and second balance levers 60 and 62 engaged, respectively, by the first and second fulcrum rollers 64 and 66 display a straight line when taken in cross-section as shown in FIGURES 5 and 6. This provides linear operation of the function generator of the invention.

Figure 7:
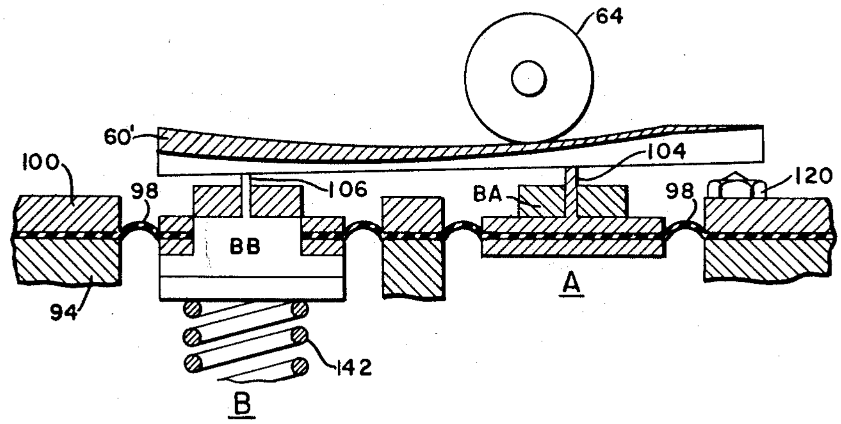
FIGURE 7 is a schematic embodiment of a detail of the invention.
Figure 8:
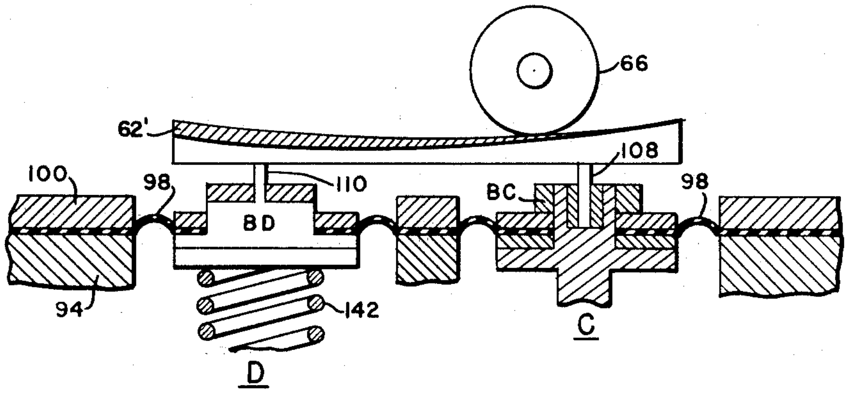
FIGURE 8 is a schematic embodiment of another detail of the invention.

A means whereby non-linear predetermined functional constraints may be imposed on the output pressure PC of the invention is shown in FIGURES 7 and 8, wherein the cross-sections of the first and second balance levers 60′ and 62′ display bearing surfaces for the first and second fulcrum rollers 64 and 66, respectively, which are curvilinear. The undersurfaces of the balance levers, however, remain flat. While these figures are schematically presented like elements to those of the embodiment of FIGURES 2, 5 and 6 bear like numerals.

OPERATION

*Embodiment of FIGS. 1, 2, 3, 4, 5 and 6*

(SINGLE SERVO-MOTOR)

The operation of the embodiment of FIGS. 1 through 6, inclusive will now be described, first assuming the following physical dimensions.

$a$≡distance from mounting pin 104 along first balance lever 60 to the point of contact therewith of the first fulcrum roller 64 (FIG. 5) and likewise, the distance from mounting pin 108 along second balance lever 62 to the point of contact therewith of the second fulcrum roller 66 (FIG. 6).

$b$≡distance from point of contact of first fulcrum roller 64 with first balance lever 60 along said lever to the mounting pin 106 (FIG. 5) and likewise, the distance from point of contact of said second fulcrum roller 66 with said second balance lever 62, along said second lever to the mounting pin 110 (FIG. 6).

Assuming linear operation, (i.e., flat bearing surfaces on the first and second balance levers 60 and 62) the output pressure C is a direct function of input pressures A, B and D.

In a balance condition of the force bridge 32, the first and second fulcrum rollers 64 and 66 will be respectively located on the first and second balance levers 60 and 62 such that with respect to the first balance lever 60, the following equation will exist:

$$Aa=Bb \qquad (1)$$

and such that with respect to the second balance lever 62 the following like equation will exist:

$$Ca=Db \qquad (2)$$

Since $$\frac{A}{B}=\frac{b}{a}$$

from Equation 1; and

Since $$\frac{C}{D}=\frac{b}{a}$$

from Equation 2;

Therefore, by substitution, $$\frac{A}{B}=\frac{C}{D}$$

this being the balance equation directly relating the output pressure C to the input pressures A, B and D.

Assuming the initial existence of a balanced condition of the force bridge 32, the operation, in accordance with the relationships defined above, is as follows:

Referring to FIGS. 2, 5 and 6, assume an increase in the input pressure A. This increase in pressure A will increase the force exerted by the diaphragm button BA via mounting pin 104 on the first balance lever 60 and cause a pivotal motion thereof about the first fulcrum roller 64. This, in turn, causes the moving valvehead 126 to open the leakport 120 and cause a drop of the pilot pressure P in the pilot pressure chamber PP.

Since, as hereinbefore described, the pilot pressure chamber PP communicates with and controls the pressure in the expansible chamber 52 of the servo-motor 26, a decrease in pilot pressure P will permit the piston return spring 54 to force the piston 40 and motor diaphragm 34 back into the expansible chamber 52 carrying the first and second fulcrum rollers therewith on the bearing carriage 68. This causes the defined distance $a$ to decrease and the defined distance $b$ to increase until the product A$a$ is again equal to the product B$b$ as it was at the original condition of balance of the force balance 32, whereby the leakport 120 will again be closed, the above products being directly proportional to the opposed moments created by the action of the diaphragm buttons BA and BB, on the first balance lever 60 about the first fulcrum roller 64 via the mounting pins 104 and 106, respectively.

The rebalancing action on the first balance lever 60, via the bearing carriage 68, causes the second fulcrum roller 66 to be repositioned to the same relative dimensions of the defined distances $a$ and $b$ on the second balance lever 62. Thus, instantaneously, the position of the bearing carriage 68 which satisfies the pressure conditions of the first balance lever 60 creates an unbalance in the pressure conditions of the second balance lever 62.

Since the input pressure D beneath the diaphragm button BD is a constant, the unbalance imposed on the second balance lever 62 will act to modulate the output pressure C beneath the diaphragm button BC as a proportionate function of the unbalance.

For example, assuming the condition of an increase in input pressure A, the increase in the dimension $b$ from the initially balanced condition and the attendant decrease in the dimension $a$ causes the product C$a$ to become less than the product D$b$.

Thus, the second balance lever 62 will be forced outwardly by the diaphragm button BD with respect to the pressure chamber PD about the second fulcrum roller 66 and the said second lever 62 will force the diaphragm button BC inwardly with respect to the output pressure chamber PC. As a result, the relay valve 144 will be unseated from the web 146 and will thus connect the main supply pressure chamber PM to the output pressure chamber PC. The main pressure M being greater than the output pressure C, the output pressure C will be increased until such time as the product C$a$ is equal to the product D$b$. When this condition occurs the relay valve 144 is permitted to seat on the web 146 and the force bridge 32 is balanced until a further variation in input pressure occurs.

Having established the operation of the function generator in terms of the parameters of its force bridge 32, the following are examples of functional constraints which may be selectively placed upon the output pressure C:

MULTIPLY AND DIVIDE $$C=\frac{A}{B}\times D$$

SQUARE

If input pressure A is constrained to equal input pressure D, then $$C=\frac{A^2}{B}=KA^2$$

where $$K=\frac{1}{B}=\text{constant}$$

SQUARE ROOT

If output pressure C is constrained to equal input pressure B, then $$C^2=AD$$

and $$C=\sqrt{A}\sqrt{D}$$
$$=K\sqrt{A}$$

where $K=\sqrt{D}=\text{constant}$

Variation of any one of the three input pressures A, B and D will produce a functionally related modulation of the output pressure C in the same direction of variation as that of the particular input variable. Thus, it is to be understood that the above-defined operation with respect to variations in input pressure A is only for the sake of example and does not suggest a limited type of operation of the function generator of the present invention.

OPERATION

*Embodiment of FIGS. 7 and 8*

SINGLE SERVO-MOTOR, NON-LINEAR BALANCE LEVERS

The output pressure C, in this embodiment, is a function of input pressures A, B and D, the contour of the first and second balance levers 60' and 62', the rates of the respective loading springs 142 and 150, and the effective operating areas of the diaphragm 98 in the vicinities of the pressure plates BA, BB, BC and BD.

Referring to FIGS. 7 and 8, with non-linear contours (bearing surfaces) on the first and second balance levers 60' and 62', an increase in pressure A, as described in the operation of the embodiment of FIGS. 1 through 6, causes the first balance lever 60' and the valvehead 126 to open the leakport 120 and cause the bearing carriage 68 and the first fulcrum roller 64 to move toward the mounting pin 104 on the diaphragm button BA. This movement acts through the first balance lever 60' to close the leakport 120 when the product A*a* is equal to the product B*b*, thus placing the first balance lever 60' in a balanced position over the leakport 120.

It will now be assumed that the point of contact of the valvehead 126 and the leakport 120 is a pivot point for the first balance lever 60' since there is an insignificant displacement of the valvehead 126 with respect to the leakport 120 necessary in order to achieve a satisfactory control effect.

Thus, movement of the bearing carriage 68 and first fulcrum roller 64 towards the mounting pin 104 will force the diaphragm button BB down into pressure chamber PB in conjunction with the biasing force of the spring 142 already acting thereon, until the product B*b* is equal to the product A*a*, the pressures B and A providing a force on the diaphragm 98 in the vicinity of the diaphragm buttons BA and BB, respectively, which is modified as a function of the respective forces exerted by the biasing springs 142 in the chambers PA and PB and the change in effective areas of the diaphragm 98 defining the flexible wall portions of these pressure chambers.

The effect of the movement of the bearing carriage 68 and hence, the second fulcrum roller 66, on the second non-linear, contoured, balance lever 62' is to unbalance the said second lever 62' such that the diaphragm button BC is depressed thereby to cause the relay valve 144 to unseat from the web 146 and increase the output pressure C as a function of the contour of the bearing surface of the second balance lever 62' until the product C*a* is equal to the product D*b*. Here, as in the case of the pressures A and B, the pressure D provides a force on the diaphragm 98 over the face thereof defining chamber PD which is modified as a function of the rate of the spring 142 and the varying effective area of the said diaphragm adjacent the said chamber.

Thus, the force bridge 32 will be rebalanced and the resultant output pressure C will have been modulated as a composite function of the variable input pressure A with an additional functional constraint imposed thereon in the form of non-linear bearing surfaces on the first and second balance levers 60' and 62', respectively.

In both of the foregoing embodiments, hysteresis in the force balance 32 is prevented by the fact that the four mounting pins 104, 106, 108 and 110, connecting the first and second balance levers 60 and 62 to the diaphragm buttons BA, BB, BC and BD, comprise flexural pivot means. Thus, all lost motion in the mechanism of the force balance 32 is eliminated and hysteresis is consequently precluded.

*The Embodiment of FIGS. 9, 10, 11 and 12*

DUAL SERVO-MOTOR TYPE

An embodiment providing individual actuation of each of the first and second fulcrum rollers of the force balance as previously defined, will now be described with reference to FIGS. 9, 10, 11 and 12 wherein like elements to the embodiments of FIGS. 1 through 8 bear like numerals.

Referring to FIGS. 9 through 12, the embodiment of the function generator shown therein comprises a housing 20' having a dual-compartmented top end cap 22', a dual-compartmented upper hollow housing section 24' forming the external confines of first and second servo-motors 26A and 26B and a lower removable four-sided cover portion 28 removably mounted on a pressure plate assembly 30 which comprises an operative support for a force bridge assembly 32.

The first and second servo-motors 26A and 26B are of the expansible chamber type and include, respectively, first and second flexible motor diaphragms 34A and 34B clamped at their peripheries between the end faces 162 and 164 of the partition members 166 and 168, forming co-extensive dual chambers internally of the top end cap 22' and upper hollow section 24', respectively, the said partition members being continuous extensions of the peripheral walls of their respective housing portions.

The centers of the first and second motor diaphragms 34A and 34B are clamped to the upper surfaces of first and second pistons 40A and 40B via clamping plates 42A and 42B, respectively. Each of the said plates are held in position by nuts 44A and 44B, respectively, threaded onto the upper tips 46A and 46B of the respective piston rods 48A and 48B which extend up through the pistons 40A and 40B and the clamping plates 42A and 42B to an extent respectively determined by integral shoulders 50A and 50B thereon which abut the lower surfaces of the pistons 40A and 40B, respectively.

The first and second operating or expansible pressure chambers 52A and 52*b*, respectively, of the first and second servo-motors 26A and 26B are respectively defined by the dual compartmented end cap 22', the partition 166 therein and the first and second motor diaphragms 34A and 34B. The first and second pistons 40A and 40B are respectively bias by means of first and second piston return springs 54A and 54B concentric with the piston rods 48A and 48B and extending from the lower surfaces of the said pistons 40A and 40B, to opposite ends of a compensating balance lever assembly 170 mounted on the lower end wall 56 of the upper housing section 24', both of the said servo-motors 26A and 26B thus being constrained to achieve a minimum volume in their respective expansible chambers 52A and 52B.

The compensating balance lever assembly 170 comprises a flat elongated balance plate 172 mounted substantially at its central transverse axis on a transversely disposed, adjustable, knife-edge type pivot means 174 having a pair of upstanding guide pins 176 thereon which are positioned in longitudinally disposed guide slots 178 in the balance plate 172. A guide post 180 and set screw 182 mounted on the end wall 56 of the upper housing section 24' cooperate with transverse slots 184 and 186, respectively, in the pivot means 174 whereby the position of the pivot edge is made selectively adjustable.

The outer ends of the balance plate 172 are bored out to provide through-ports 188 and 190 for the first and second piston rods 48A and 48B, respectively. Upstanding flanges 192 and 194 are respectively provided about the peripheries of the through ports 188 and 190 whereby each end of the balance plate 172 is adapted to be juxtaposed with the lower end of a respective one of the said piston return springs 54A and 54B.

The first and second piston rods 48A and 48B extend through respective bushings 54A and 54B in the lower wall 56 of the upper housing section 24' and out over a particular portion of the force balance assembly 32.

Figure 9:
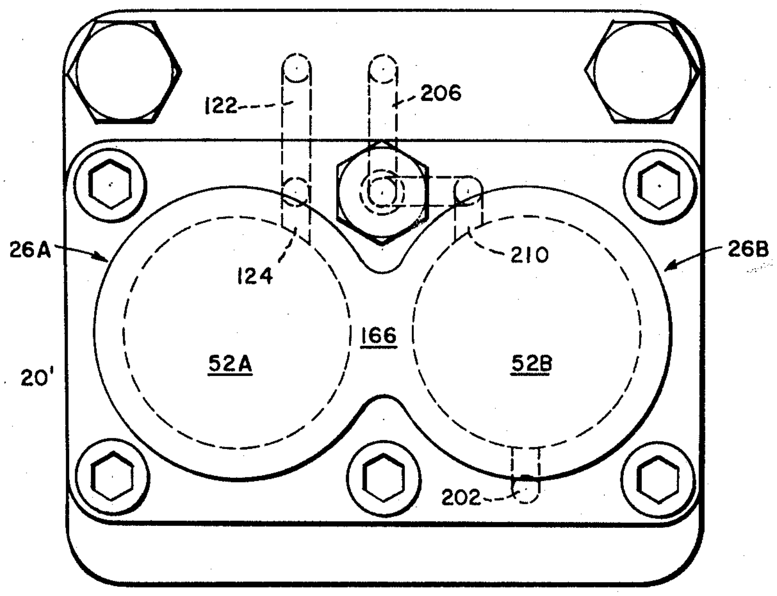
FIGURE 9 is a top plan view of another embodiment of the invention.
Figure 11:
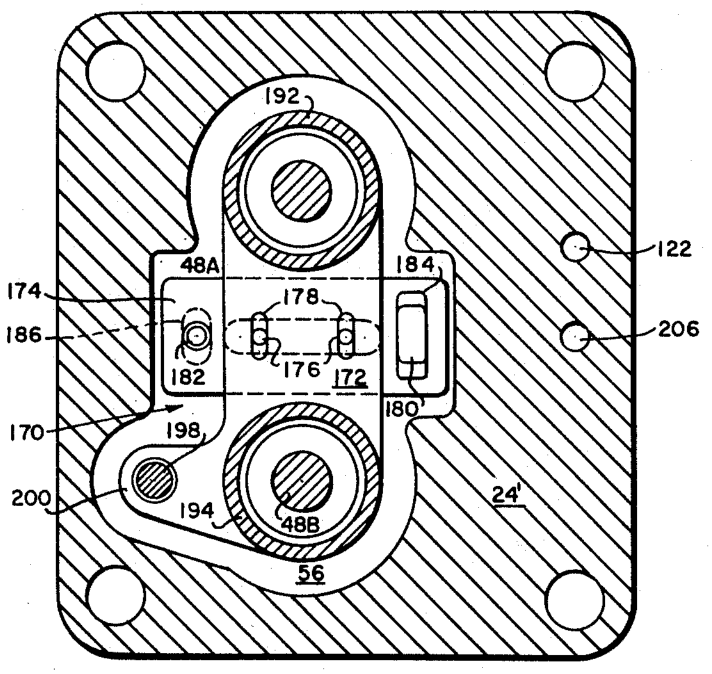
FIGURE 11 is a detailed cross-section taken along line 11—11 of FIGURE 12.

As previously described in conjunction with FIG. 2, the force balance of FIG. 9 comprises first and second balance levers 60 and 62 having first and second fulcrum rollers 64 and 66, respectively, engageable with the upper bearing surfaces thereof. In the embodiment of FIGS. 9 through 12, however, the fulcrum rollers are mounted upon individual bearing carriages in the form of bifurcated end members 68A and 68B mounted on the outer ends of the first and second piston rods 48A and 48B, respectively. Each piston rod, therefore, extending above a respective one of the said first and second balance levers 60 and 62.

With the exception of the fact that there are now first and second pairs of guide rollers 76 and 78, respectively associated with the first and second fulcrum rollers 64 and 66, due to the separate bearing carriages 68A and 68B, the remainder of the force bridge assembly 32 is equivalent to that previously fully described with reference to FIGS. 2, 5 and 6.

The leakport 120 cooperating with the valvehead 126 on the first balance lever 60 controls the pilot pressure P in the pilot pressure chamber PP which pressure is ported via the transfer port 122 in the base plate 88 and upper housing portion 24′, to a pressure port 124 opening into the expansible chamber 52A of the first servo-motor 26A. The pilot pressure P for positioning the piston 40A of the first servo-motor 26A is thus directly controlled by the force bridge 32 via the leakport 120.

In order to constrain the second servo-motor 26B to position the second fulcrum roller 66, via the second piston rod 48B, along the second balance lever 62 as a proper correlated function of the position of the first fulcrum roller 64 on the first balance lever 60, a second leakport 196 is positioned in the upper housing portion 24′ of the second servo-motor 26B. The second leakport 196 cooperates with a second moving valvehead 198 mounted on an integral extension 200 of the balance plate 172 in the compensating balance lever assembly 170 to selectively exhaust the expansible chamber 52B of the second servo-motor 26B whereby a second pilot pressure P′ is generated therein as a variable back-pressure in the leakport chamber PP′ of the second leakport 196. The second leakport chamber PP′ communicates directly with the expansible chamber 52B of the second servo-motor 26B via a transfer port 202 and a pressure port 204.

Figure 12:
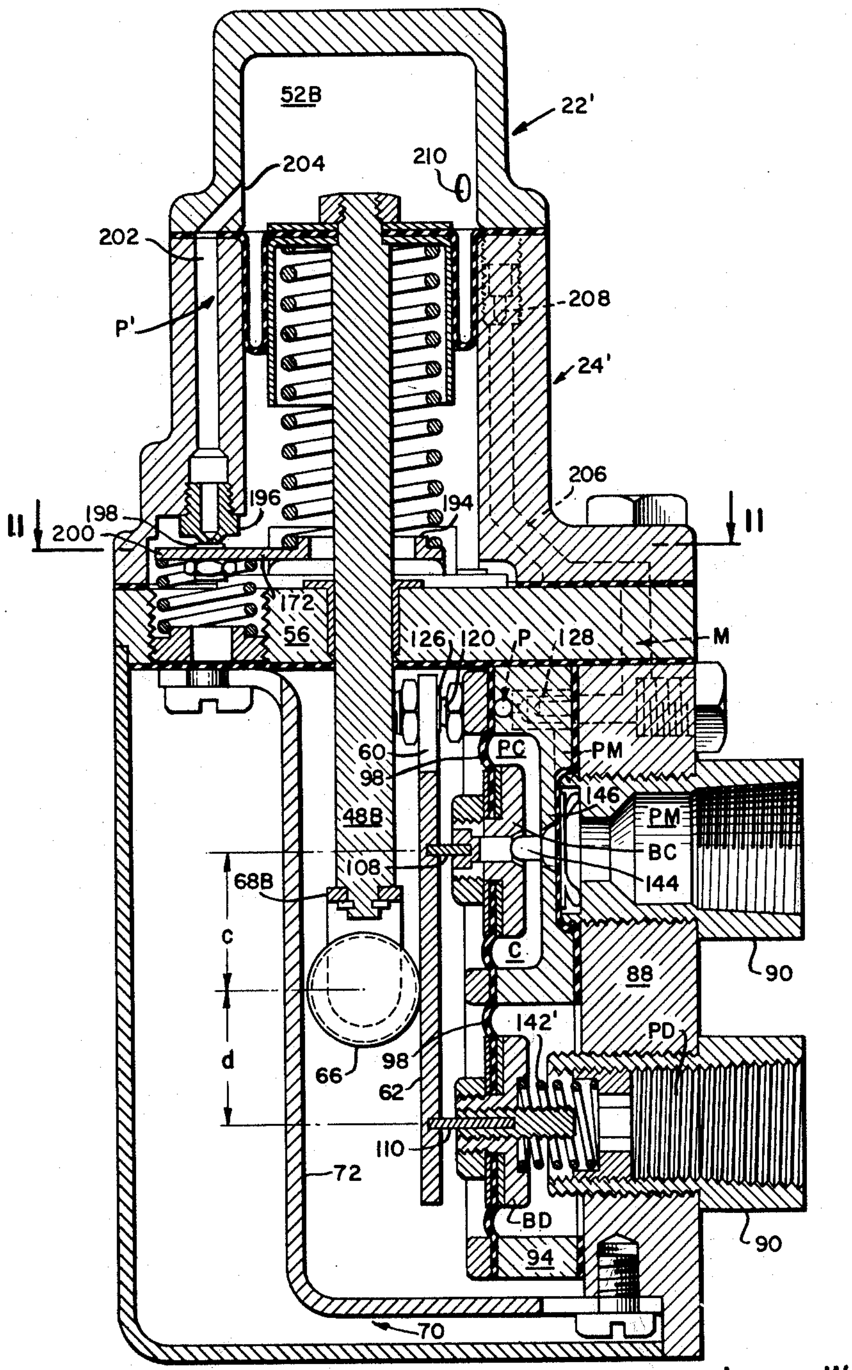
FIGURE 12 is a detailed cross-section taken along line 12—12 of FIGURE 10.

The source of supply pressure feeding the expansible chamber 52B of the second servo-motor 26B is shown in FIG. 12 as comprising a transfer port 206 connected with an extension of the main supply pressure chamber PM in the pressure transfer plate 94 whereby supply pressure M is admitted to the transfer port 206. The transfer port 206 extends through the base plate 88 and the upper housing portion 24′, through a restrictor 208, to a pressure inlet port 210 in the inner wall of the second expansible chamber 52B.

In operation, a similar set of balance equations to those already defined for the embodiments of FIGS. 1 through 8 may be applied, first assuming the following physical dimensions.

Figure 10:
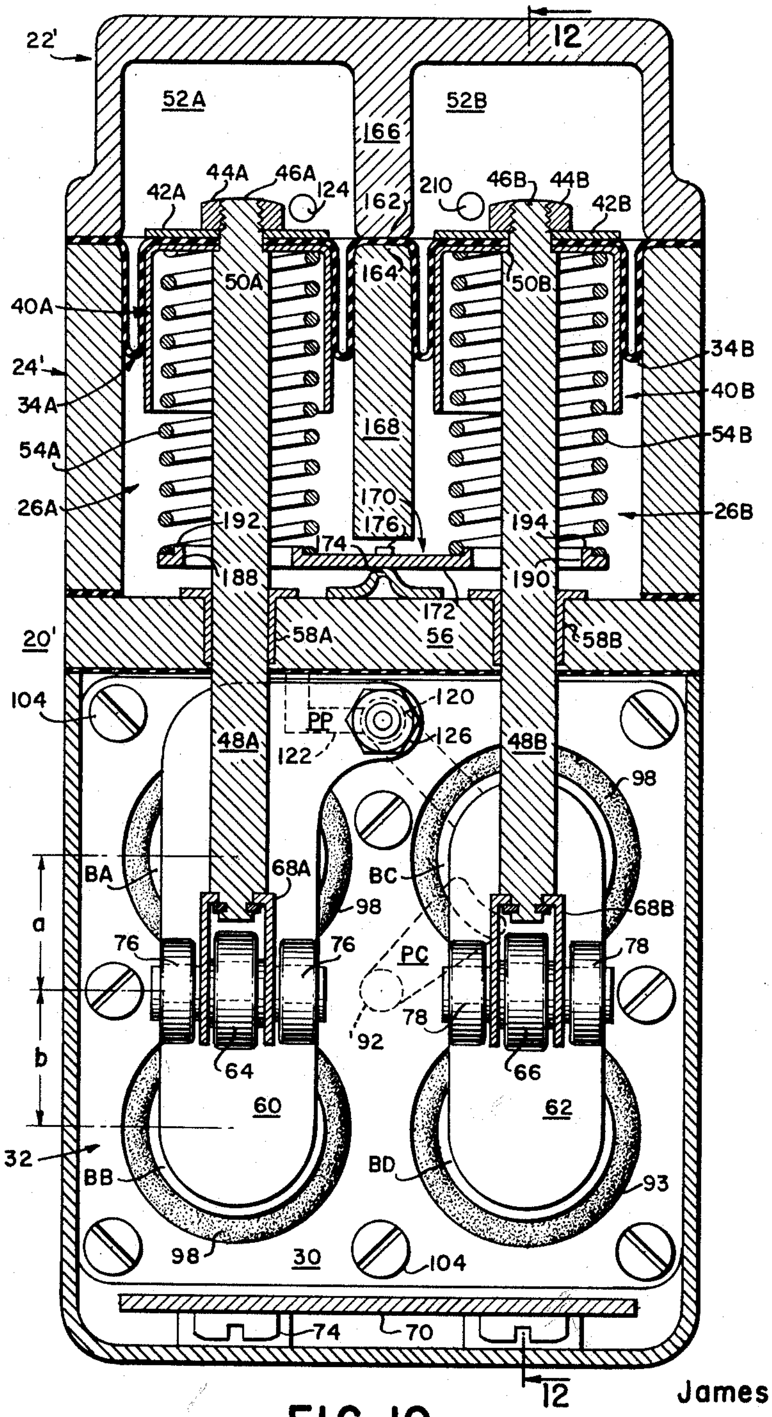
FIGURE 10 is a front elevation of the embodiment of FIGURE 9.

$a$≡distance from mounting pin 104 along first balance lever 60 to the point of contact therewith of the first fulcrum roller 64 (same as FIG. 5, see FIG. 10).

$b$≡distance from point of contact of first fulcrum roller 64 with first balance lever 60 along said lever to the mounting pin 106 (same as FIG. 5, see FIG. 10).

$c$≡distance from mounting pin 108 along second balance lever 62 to the point of contact therewith of the second fulcrum roller 66 (FIG. 12).

$d$≡distance from point of contact of second fulcrum roller 66 with second balance lever 62 along said lever to the mounting pin 110 (FIG. 12).

Assuming linear operation (i.e., flat bearing surfaces on the first and second balance levers 60 and 62) the output pressure C is a direct function of input pressures A, B and D.

In a balance condition of the force bridge 32, the first and second fulcrum rollers 64 and 66 will be respectively located on the first and second balance levers 60 and 62 such that with respect to the first balance lever 60, the following equation will exist:

$$Aa=Bb \quad (1)$$

and such that with respect to the second balance lever 62 the following similar equation will exist:

$$Cc=Dd \quad (2)$$

Since $$\frac{A}{B}=\frac{b}{c}$$

from Equation 1; and

Since $$\frac{C}{D}=\frac{d}{c}$$

from Equation 2.

Therefore, if by proper calibration, the quantities $$\frac{b}{a}$$

and $$\frac{d}{c}$$

are made initially equal, the balance equation may be expressed purely by two pressure ratios as follows:

$$\frac{A}{B}=\frac{C}{D}$$

Thus, the same balance equation is effected here along with the same multiplication, division, square and square root functions previously defined in connection with the embodiments of FIGS. 1 through 8.

Assuming the initial existence of a balanced condition of the force bridge 32, the operation, in accordance with the relationships defined above is as follows:

Referring to FIGS. 9, 10, 11 and 12, assume an increase in the input pressure A will act on the first balance lever 60 to cause the product A$a$ to be greater than the product B$b$, the moments which these products represent causing the first balance lever 60 to pivot on the first fulcrum roller 64. This motion, in turn, causes the valvehead 126 thereon to open the leakport 120 and cause a drop of the pilot pressure P in the pilot pressure chamber PP.

Since, as hereinbefore described, the pilot pressure chamber PP communicates with and controls the pressure in the expansible chamber 52A of the first servo-motor 26A, a decrease in the pilot pressure P will permit the piston return spring 54A to force the piston 40A and motor diaphragm 34A back into the expansible chamber 52A carrying the first fulcrum roller 64 therewith by way of the bearing carriage 68′ on the outer end of the first piston rod 48A. This causes the defined distance $a$ to decrease and the defined distance $b$ to increase until the product A$a$ is again equal to the product B$b$ as it was at the original condition of balance of the force balance 32, whereby the leakport 120 will again be closed, the above products being directly proportional to the opposed moments created by the action of the diaphragm buttons BA and BB, on the first balance lever 60, about the first fulcrum roller 64 via the mounting pins 104 and 106, respectively. The mounting pins 104 and 106 are shown in FIG. 5 in the same relationship as FIG. 10.

In a balanced position of the force bridge 32, the force of the first piston return spring 54A, of the first servo-motor 26A, balances the force of the second piston return spring 54B, of the second servo-motor 26B, via the balance plate 172 of the compensating balance assembly 170.

Since movement of the first piston 40A into the expansible chamber 52A decreases the force exerted on the corresponding end of the balance plate 172 by the first return spring 54A, the greater present force of the second return spring 54B acting on the opposite end of the balance plate 172 causes the plate to pivot on the knife edge pivot 174, moves the second valvehead 198 on the balance plate extension 200 and thereby open the second leakport 196. Thus, the pressure in the expansible chamber 52B in the second servo-motor 26B is exhausted, permitting the second return spring 54B to force the piston 40B and motor diaphragm 34B inward in the said chamber 52B until the balance plate 172 causes the second leakport 196 to close, the force exerted on the said plate by the said first and second return springs now being equal.

This compensating movement of the second piston 40B causes the second piston rod 48B, via the bearing carriage 68' thereon, to move the second fulcrum roller 66 along the second balance lever 62 of the force bridge 32 in such a direction as to decrease the defined distance $c$ and increase the defined distance $d$. Instantaneously, this will cause the product $Dd$ to be greater than the product $Cc$, whereby the resulting moment acting about the second fulcrum roller 66 on the said second balance lever 62 will cause the diaphragm button BC to be depressed inward with respect to the control pressure chamber PC, via the action of the mounting or flexural pivot pin 108.

As previously described in conjunction with the operation of the embodiments of FIGS. 1 through 8, depressing the diaphragm button BC causes the relay valve 144 to unseat from the web 146 and admit main pressure M from the main pressure chamber PM into the output pressure chamber PC until such time as the control pressure C therein has been modulated to a value such that the product $Cc$ is equal to the product $Dd$. At this point, the force bridge 32 is balanced and the output pressure C has been modulated in accordance with a pre-determined function of the input pressures A, B and D.

It is to be understood that the non-linear embodiment of FIGS. 7 and 8 may be incorporated in the embodiment of FIGS. 9 through 12 in the identical manner as it was in the embodiment of FIGS. 1 through 6.

The output pressure C is a linear function of input pressures A, B and D if the first and second balance levers 60 and 62 have flat bearing surfaces and if the travel of the first piston 40A is equal to the travel of the second piston 40B.

If the bearing surfaces of the first and second balance levers 60 and 62 are non-linear, then, the output pressure C is a composite function of the input pressures A, B, C and D; the effective areas of the diaphragm 98 over the pressure chambers A, B, C and D; the rate of the biasing springs in the servo-motors 26A and 26B and the force bridge 32; and the relationship of the relative travel of the first and second pistons 40A and 40B.

As can be seen from the foregoing specification and drawings, this invention provides a new and novel pneumatic function generator for providing a modulated output pressure as a pre-determined function of a plurality of input pressures by means of a servo-motor rebalanced force bridge.

It is to be understood that the embodiments shown and described herein are for the purpose of example only and are not intended to limit the scope of the appended claims.

What is claimed is:

1. A pneumatic function generator for producing a modulated output pressure as a pre-selected function of a plurality of input pressures comprising a force bridge including first and second balance levers, adjustable fulcrum means for said levers and pressure means responsive to said pressures for applying variable forces to opposite ends of said levers; and servo-means controlled by said force bridge as a function of the deviation of said force bridge from a balanced condition and connected with said adjustable fulcrum means to selectively position said fulcrum means on said balance levers to rebalance said force bridge; said pressure means for applying variable forces to opposite ends of said levers comprising a pressure plate having a plurality of pressure chambers therein, a flexible diaphragm element co-extensive with said plate and clamped thereto defining a displaceable wall portion for each of said pressure chambers, and means mounted on each of said displaceable wall portions of said diaphragm and adapted to receive one end of one of said balance levers, whereby said balance levers may be mounted between selected pairs of said displaceable wall portions.

2. The invention defined in claim 1, wherein said servo-means includes a position-modulated output means extending therefrom adjacent said force bridge and wherein said fulcrum means comprises a bearing carriage mounted on said output means and extending therefrom to a position adjacent each of said balance levers, and fulcrum rollers rotatably mounted on said bearing carriage in juxtaposition with each of said balance levers.

3. The invention defined in claim 2, wherein said balance levers each include bearing surfaces in juxtaposition with said fulcrum rollers, said bearing surfaces being contoured in accordance with pre-selected mathematical functions.

4. The invention defined in claim 2, wherein said force bridge includes a fixed guide plate having a bearing surface co-extensive with said balance levers and wherein said fulcrum means further includes integral guide rollers rotatably mounted on said bearing carriage in juxtaposition with the said bearing surface of said guide plate.

5. The invention defined in claim 4, wherein said balance levers each include bearing surfaces in juxtaposition with said fulcrum rollers, said bearing surfaces being contoured in accordance with pre-selected mathematical functions.

6. The invention defined in claim 1, wherein said servo-means includes first and second position-modulated output means extending therefrom adjacent said first and second balance levers, respectively, of said force bridge, and wherein said fulcrum means comprises first and second bearing carriages mounted, respectively, on said first and second output means and first and second fulcrum rollers rotatably mounted, respectively, on said first and second bearing carriages in juxtaposition, respectively, with said first and second balance levers.

7. The invention defined in claim 6, wherein said first and second balance levers include, respectively, first and second bearing surfaces in juxtaposition, respectively, with said first and second fulcrum rollers, said bearing surfaces being contoured in accordance with pre-selected mathematical functions.

8. The invention defined in claim 6, wherein said force bridge includes a fixed guide plate having a bearing surface co-extensive with said balance levers and wherein said fulcrum means further includes integral guide rollers rotatably mounted on each of said first and second bearing carriages in juxtaposition with the said bearing surface of said guide plate.

9. The invention defined in claim 8, wherein said first and second balance levers include, respectively, first and second bearing surfaces in juxtaposition, respectively, with said first and second fulcrum rollers, said bearing surfaces being contoured in accordance with pre-selected mathematical functions.

10. The invention defined in claim 1, wherein said first and second balance levers include, respectively, first and second bearing surfaces in juxtaposition with said fulcrum means, said bearing surfaces being contoured in accordance with pre-selected mathematical functions, whereby said output pressure may be selectively modulated as a pre-determined function of said plurality of input pressures.

11. The invention defined in claim 1, wherein said means mounted on each of said displaceable wall portions of said diaphragm for mounting said balance levers thereon comprise flexure hinge means, whereby hysteresis is precluded in said force bridge.

12. The invention defined in claim 1, wherein said means mounted on each of said displaceable wall portions of said diaphragm for mounting said balance levers thereon comprise flexure hinge means, said hinge means comprising a diaphragm button integral with each of said wall portions and an upstanding pin integral with each of said diaphragm buttons at one end thereof and adapted to be fixedly connected at its other end with a selected one of said balance levers.

13. The invention defined in claim 1, wherein said force bridge further includes adjustable biasing means for each of said displaceable wall portions whereby the operating level each of said output and input pressures may be selectively adjusted.

14. A pneumatic function generator for producing a modulated output pressure as a pre-selected function of a plurality of input pressures comprising a force bridge including first and second balance levers, adjustable fulcrum means for said levers and pressure means responsive to said pressures for applying variable forces to opposite ends of said levers; and servo-means controlled by said force bridge as a function of the deviation of said force bridge from a balanced condition and connected with said adjustable fulcrum means to selectively position said fulcrum means on said balance levers to re-balance said force bridge; said balance levers each including a bearing surface in juxtaposition with said fulcrum means, said bearing surfaces being contoured in accordance with pre-selected mathematical functions.

15. The invention defined in claim 14, wherein said servo-means includes a position-modulated output means extending therefrom adjacent said force bridge and wherein said fulcrum means comprises a bearing carriage mounted on said output means and extending therefrom to a position adjacent each of said balance levers, and fulcrum rollers rotatably mounted on said bearing carriage in juxtaposition with each of said balance levers.

16. The invention defined in claim 15, wherein said force bridge includes a fixed guide plate having a bearing surface co-extensive with said balance levers and wherein said fulcrum means further includes integral guide rollers rotatably mounted on said bearing carriage in juxtaposition with the said bearing surface of said guide plate.

17. The invention defined in claim 14, wherein said servo-means includes first and second position-modulated output means extending therefrom adjacent said first and second balance levers, respectively, of said force bridge, and wherein said fulcrum means comprises first and second bearing carriages mounted, respectively, on said first and second output means and first and second fulcrum rollers rotatably mounted, respectively, on said first and second bearing carriages in juxtaposition, respectively, with said first and second balance levers.

18. The invention defined in claim 17, wherein said force bridge includes a fixed guide plate having a bearing surface co-extensive with said balance levers and wherein said fulcrum means further includes integral guide rollers rotatably mounted on each of said first and second bearing carriages in juxtaposition with the said bearing surface of said guide plate.

19. A pneumatic function generator for producing a modulated output pressure as a pre-selected function of a plurality of input pressures comprising a force bridge including first and second balance levers, adjustable fulcrum means for said levers and pressure means responsive to said pressures for applying variable forces to opposite ends of said levers; and servo- means controlled by said force bridge as a function of the deviation of said force bridge from a balanced condition and connected with said adjustable fulcrum means to selectively position said fulcrum means on said balance levers to re-balance said force bridge; said servo-means including a position-modulated output means extending therefrom adjacent said force bridge; said force bridge further including a fixed guide plate having a bearing surface co-extensive with said balance levers; and said fulcrum means comprising a bearing carriage mounted on said output means and extending therefrom to a position adjacent each of said balance levers, integral guide rollers rotatably mounted on said bearing carriage in juxtaposition with the said bearing surface of said guide plate and fulcrum rollers rotatably mounted on said bearing carriage in juxtaposition with each of said balance levers.

20. A pneumatic function generator for producing a modulated output pressure as a pre-selected function of a plurality of input pressures comprising a force bridge including first and second balance levers, adjustable fulcrum means for said levers and pressure means responsive to said pressures for applying variable forces to opposite ends of said levers; and servo-means controlled by said force bridge as a function of the deviation of said force bridge from a balanced condition and connected with said adjustable fulcrum means to selectively position said fulcrum means on said balance levers to re-balance said force bridge; said servo-means including first and second position-modulated output means extending therefrom adjacent said first and second balance levers, respectively of said force bridge; said force bridge further including a fixed guide plate having a bearing surface co-extensive with said balance levers; and said fulcrum means comprising first and second bearing carriages mounted, respectively, on said first and second output means, integral guide rollers rotatably mounted on each of said first and second bearing carriages in juxtaposition with said bearing surface of said guide plate, and first and second fulcrum rollers rotatably mounted, respectively, on said first and second bearing carriages in juxtaposition, respectively, with said first and second balance levers.

21. A pneumatic function generator for producing a modulated output pressure as a pre-selected function of a plurality of input pressures comprising a force bridge including first and second balance levers, adjustable fulcrum means for said levers and pressure means responsive to said pressures for applying variable forces to opposite ends of said levers; expansible chamber servo-means connected with said adjustable fulcrum means; a source of pilot pressure for said servo-means; control means on said first balance lever for varying said pilot pressure as a function of the degree of unbalance of said force bridge, whereby said servo-means is actuated to position said fulcrum means to compensate for said unbalance in said force bridge as reflected in said first balance lever; pressure relay means for modulating said output pressure controlled by said second balance lever and means for applying a re-balancing force to said second balance lever as a function of said output pressure; said pressure means for applying variable forces to opposite ends of said levers comprising a pressure plate having a plurality of pressure chambers therein, a flexible diaphragm element co-extensive with said plate and clamped thereto define a displaceable wall portion for each of said pressure chambers, and means mounted on each of said displaceable wall portions of said diaphragm and adapted to receive one end of one of said balance levers, whereby said balance levers may be mounted between selected pairs of said displaceable wall portions.

22. The invention defined in claim 21, wherein said servo-means includes a position-modulated output means extending therefrom adjacent said force bridge and wherein said fulcrum means comprises a bearing carriage mounted on said oput means and extending therefrom to a position adjacent each of said balance levers, and fulcrum rollers rotatably mounted on said bearing carriage in juxtaposition with each of said balance levers.

23. The invention defined in claim 22, wherein said balance levers each include bearing surfaces in juxtaposition with said fulcrum rollers, said bearing surfaces being contoured in accordance with pre-selected mathematical functions.

24. The invention defined in claim 22, wherein said force bridge includes a fixed guide plate having a bearing surface co-extensive with said balance levers and wherein said fulcrum means further includes integral guide rollers rotatably mounted on said bearing carriage in juxtaposition with the said bearing surface of said guide plate.

25. The invention defined in claim 24, wherein said balance levers each include bearing surfaces in juxtaposition with said fulcrum rollers, said bearing surfaces being contoured in accordance with pre-selected mathematical functions.

26. The invention defined in claim 21, wherein said servo-means includes first and second position-modulated output means extending therefrom adjacent said first and second balance levers, respectively, of said force bridge, and wherein said fulcrum means comprises first and second bearing carriages mounted, respectively, on said first and second output means and first and second fulcrum rollers rotatably mounted, respectively, on said first and second bearing carriages in juxtaposition, respectively, with said first and second balance levers.

27. The invention defined in claim 26, wherein said first and second balance levers include, respectively, first and second bearing surfaces in juxtaposition, respectively, with said first and second fulcrum rollers, said bearing surfaces being contoured in accordance with pre-selected mathematical functions.

28. The invention defined in claim 26, wherein said force bridge includes a fixed guide plate having a bearing surface co-extensive with said balance levers and wherein said fulcrum means further includes integral guide rollers rotatably mounted on each of said first and second bearing carriages in juxtaposition with the said bearing surface of said guide plate.

29. The invention defined in claim 28, wherein said first and second balance levers include, respectively, first and second bearing surfaces in juxtaposition, respectively, with said first and second fulcrum rollers, said bearing surfaces being contoured in accordance with pre-selected mathematical functions.

30. The invention defined in claim 21, wherein said first and second balance levers include, respectively, first and second bearing surfaces in juxtaposition with said fulcrum means, said bearing surfaces being contoured in accordance with pre-selected mathematical functions, whereby said output pressure may be selectively modulated as a pre-determined function of said plurality of input pressures.

31. The invention defined in claim 21, wherein said means mounted on each of said displaceable wall portions of said diaphragm for mounting said balance levers thereon comprises flexure hinge means, whereby hysteresis is precluded in said force bridge.

32. The invention defined in claim 21, wherein said means mounted on each of said displaceable wall portions of said diaphragm for mounting said balance levers thereon comprise flexure hinge means, said hinge means comprising a diaphragm button integral with each of said wall portions and an upstanding pin integral with each of said diaphragm buttons at one end thereof and adapted to be fixedly connected at its other end with a selected one of said balance levers.

33. The invention defined in claim 21, wherein said force bridge further includes adjustable biasing means for each of said displaceable wall portions whereby the operating level each of said output and input pressures may be selectively adjusted.

34. The invention defined in claim 21, wherein said servo-means comprises first and second expansible chamber servo-motors, and said fulcrum means comprises individually adjustable fulcrum means connected one to each of said servo-motors for said first and second balance levers, respectively, first and second biasing means for said motors, respectively, force balance means interconnected between said biasing means, and valve means controlled by said force balance means as a function of the strength differential of said biasing means, both of said servo-motors being supplied from said source of pilot pressure, the pilot pressure in said first servo-motor being controlled by said control means on said first balance lever and the pilot pressure in said second servo-motor being controlled by said valve means.

References Cited by the Examiner

UNITED STATES PATENTS

| | | | |
|---|---|---|---|
| 2,937,528 | 5/60 | Ketchum | 73—407 |
| 2,967,537 | 1/61 | Morris | 137—85 XR |
| 2,976,731 | 3/61 | Westman | 73—407 |
| 3,018,763 | 1/62 | Goerke | 137—85 XR |

References Cited by the Applicant

UNITED STATES PATENTS

| | | |
|---|---|---|
| 2,643,055 | 6/53 | Sorteberg. |
| 2,918,214 | 12/59 | Sorteberg. |

ISADOR WEIL, *Primary Examiner.*

LAVERNE D. GEIGER, WILLIAM F. O'DEA, *Examiners.*